Dec. 9, 1958     R. GROSS     2,863,694
(SEMI) AUTOMATIC PARACHUTE DETACH DEVICE
Filed Feb. 6, 1956
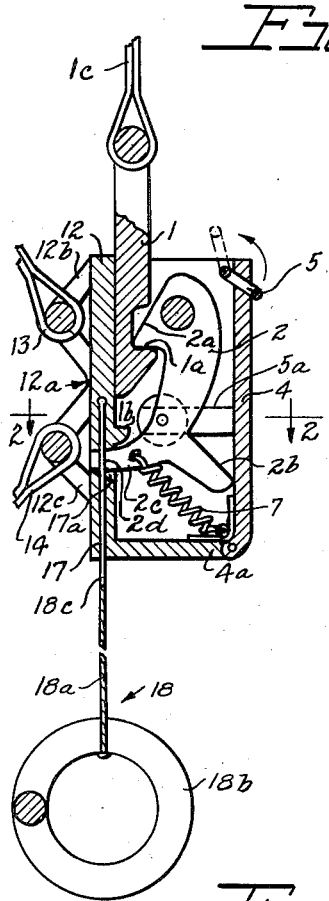
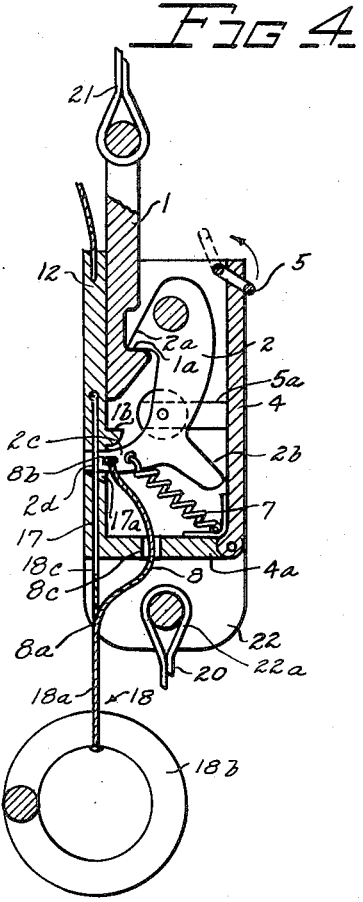
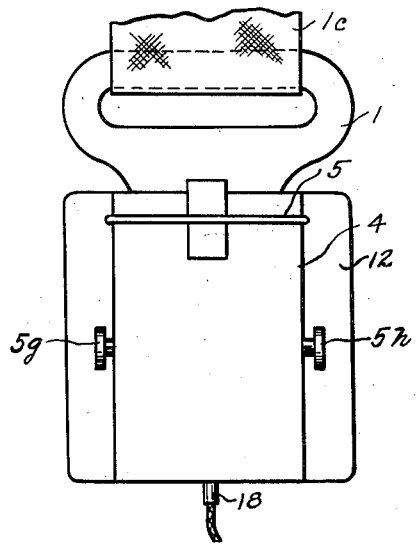
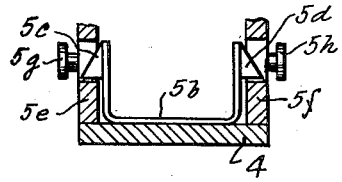
INVENTOR.
REINHOLD GROSS
BY
ATTORNEYS

2,863,694

(SEMI) AUTOMATIC PARACHUTE DETACH DEVICE

Reinhold Gross, Dayton, Ohio

Application February 6, 1956, Serial No. 563,815

9 Claims. (Cl. 294—83)

(Granted under Title 35, U. S. Code (1952), sec. 266)

The invention described herein may be manufactured and used by or for the United States Government for governmental purposes without payment to me of any royalty thereon.

This invention relates to a parachute detach device by which a parachutist is released from his parachute. More particularly, the invention relates to a device that effects a safe and fast release, semi-automatic or automatic in operation, at the moment the parachutist lands on ground or water.

An immediate operative disengaging device upon ground or water contact is necessary in order to eliminate or greatly reduce injuries resulting from accidents from dragging or drowning. Wind velocities of only ten (10) M. P. H. readily produce a drag force in the vicinity of 100 lbs. It is thus seen that extrication from a parachute can be extremely difficult without a simple detach device. Moreover, it is of the utmost importance particularly with reference to a landing in enemy territory that the military parachutist be free to handle his weapon and effect a rapid release from his parachute on landing to enable him either to engage with the enemy or rejoin his unit.

Accordingly, it is an object of the invention to provide a simple and workable detach or release device that permits disengagement either automatically or semi-automatically.

It is a further object of the invention to utilize a new detach mechanism equipped with a plurality of safety devices to insure against premature operation of said detach mechanism and to retain control thereof in the hands of the parachutist.

It is still a further object of the invention to specifically provide the detach device with three safeties, all of which must be positively actuated before release of the parachute is effected.

Another object of the invention is to provide a detach device which automatically unlocks by means of loss of tension in the parachute risers occasioned by the sharp reduction of load thereon at the moment the descending parachutist contacts land or water.

An object of the invention is to utilize a parachute detach or release mechanism which may be operated either automatically on contact with the ground or water or semi-automatically (manually) by the parachutist himself.

Other objects and advantages of the invention will become apparent from the following description, taken in connection with the accompanying drawings in which like reference characters refer to like parts in the several figures.

Fig. 1 is a partial sectional view of one form of the detach device utilized in the invention.

Fig. 2 is a view of safety No. 2 taken along section 2—2 of Fig. 1.

Fig. 3 is a front view of the detach device and adapter shown in Fig. 1.

Fig. 4 is a view similar to Fig. 1 showing a modified form of the invention.

Referring more particularly to Figs. 1-3, the detach device comprises a box-like body having a wall 4a at one end thereof and open at the other end, side walls 5e and 5f, a bottom wall 12, a hinge cover 4, and a spring-urged latch 2 rotatably positioned therein. Said wall 12 includes a flange 12a having two projecting portions 12b and 12c extending therefrom to which are connected a pair of harness attachment webs 13 and 14.

The latch 2 is generally L-shaped and consists of three main portions. The first portion includes an angular protruding element 2a, the second portion 2b engages with the cover 4 when the latter is in its closed or locked position, and the third portion 2c engages in an opening 17a in the wall member 12. This latter portion 2c contains an opening or hole 2d longitudinally aligned with the groove 17 in the wall member 12, the purpose of which will be explained hereinafter. The protruding portion or element 2a is engaged with the hooked portion 1a of an adapter 1 connected to the parachute suspension line as seen in Fig. 1. The construction of said adapter is seen in Fig. 3. The adapter with the latch 2 forms the detach device of the instant invention. In addition, said latch 2 is urged in a counterclockwise direction by means of a tension spring 7 that is connected between said portion 2c and the left hand portion of the wall 4a as viewed in Fig. 1.

The detach device described above with reference to Figs. 1-3 incorporates three safety devices designed to prevent accidental or premature operation thereof. Safety No. 1 illustrated at 5 in Figs. 1 and 3 consists of a wire incorporating a flat spring and is rotatably mounted as shown to lock the cover 4 in its closed position; safety No. 2 indicated at 5a in Fig. 1 and in detail in Fig. 2 includes a flat U-shaped spring 5b fixed to said cover 4 and having a pair of projections 5c and 5d engaging holes in the side walls 5e and 5f, respectively. A pair of knobs 5g and 5h slidably positioned in said holes are provided for squeezing spring-pressed projections 5c and 5d to disengage the latter from said side walls; safety No. 3 shown at 18 in Figs. 1 and 3 includes a pull wire or cable 18a connected to a pull ring 18b and a safety pin 18c frictionally held in the groove 17 and in the hole 2d of the wall 12 and the latch 2, respectively, when the latter is in its locked position.

The adapter 1 is slidably positioned or disposed in the open end of the detach device and is normally held in its uppermost position in locking engagement with the latch 2 by the tension on the parachute risers connected thereto by the parachute suspension line connection 1c during descent of the parachutist. It is evident that such tension on the risers is lost or materially reduced at the moment the descending parachutist contacts ground or water. Naturally, the adapter 1 at this point continues to travel in a downward direction and moves relatively to the detach device until it strikes the limit lug 1b. During this interval between the moment of ground or water contact and the relative movement of the adapter 1, the hook portion 1a disengages from the element 2a of the latch 2 and since the latter is under pressure of the spring 7 it rotates in a counterclockwise direction to its nonlocking position. Now, when immediately after contact with ground or water the wind exerts a dragging pressure on the parachute, the latter and the adapter 1 are completely free of any restraint in the detach device and complete separation follows. Of course, all three safeties must have been removed prior to the moment of contact; otherwise, no separation will occur.

To summarize the operation of the mechanism of Figs. 1-3, it has been determined that for proper automatic functioning of the detach device, safety No. 3 is released first by removing its safety pin 18c followed by the release or removal of safety No. 1 and safety No. 2 in that order. Then, on contact by the parachutist with land or water the tension in the parachute suspension lines is relaxed or removed completely, the adapter 1 then moves relative to the detach device to disengage its hook portion from the latch 2, and the latter rotates to its nonlocking position to completely disconnect the parachute from its harness. Semi-automatic operation is also effected but with a different sequence of operation. In the latter case, safety No. 1, safety No. 2, and safety No. 3 are released in that order. The first two safeties are removed prior to the parachutist landing and the last safety (No. 3) is removed immediately on ground or water contact to thereby completely separate the parachute from its harness in the same manner as previously outlined above for automatic operation.

It is noted that in the first modification the detach device utilizes certain structure for attachment to the shoulder harness whereas this structure is eliminated in the second modification described hereinafter particularly with reference to Fig. 4. In the latter modification, the detach device is attached between the shoulder harness and the parachute suspension lines by a pair of webs 20 and 21. The detach device of the second modification is almost identical to that of the first modification; however, as seen in Fig. 4, the second detach device has eliminated the flange 12a of the first modification, and has added the extension 22 to which the shoulder harness attachment web 20 is fixed. Said extension 22 may be of any suitable design, as for example, two spaced apart arms with the bar 22a fixed therebetween. The web 20 is positioned at one end on said bar 22a and at its other end to the shoulder harness (not shown). The web 21 is similar to the parachute suspension line connection 1c of Figs. 1–3 and acts as the connection between the adapter 1 and the parachute suspension lines (not shown).

In addition to the structure described above, a cable 8 is connected between safety No. 3 at 8a and the latch 2 at the point 8b. Said cable 8 is fed or directed into the detach device by means of a slot 8c positioned to provide a slack of approximately 2 inches. With the exception of the connections to the detach device and the cable 8, the remaining parts of the second embodiment disclosed in Fig. 4 are identical to and operate the same as those of Figs. 1–3.

In the second modification of Fig. 4, it is seen that semi-automatic or manual operation is effected in a more positive manner than in the first modification of Figs. 1–3. This is accomplished by the utilization of the cable 8 in which case the latch 2 is given a more positive rotation than when rotated by the spring 7 alone. Thus, an additional safety precaution is built into the detach device particularly when semi-automatically or manually operated. It is noted that in such operation, safety No. 3 is released at the last moment on contact by the parachutist with ground or water. It is imperative that the latter release safety No. 3 at the proper moment. A premature release would, of course, defeat the purpose of semi-automatic release on landing and would condition the mechanism for full automatic separation whereas a delay of an undue period of time would defeat the aim of a release immediately on contact with land or water to prevent injuries or possible drowning; however, in the event the latter does occur, the additional feature of the cable 8 will assure a complete separation as a result of a two-step operation. First, safety No. 3 is released and, second, on further operation of its pull ring, the cable 8 will be operated to more positively actuate or rotate the spring-urged latch 2. Therefore, a positive disengagement of the parachute from the shoulder harness is effected during semi-automatic or manual operation of the detach device of the second embodiment. For automatic operation of the second embodiment, the same sequence of operation is involved as in the first modification, namely, safety No. 3 is released first and then safety No. 1 and safety No. 2 in that order.

It is therefore, seen that the present invention involves a new and unique detach mechanism, simple to assemble and yet reliable and dependable in operation. Furthermore, there is provided a device that is rapid in operation but prevents premature release because of the incorporation of a plurality of safety devices, all of which must be removed or released before the parachute is separated from its shoulder harness.

I claim:

1. In a parachute detach device, a container adapted to be affixed to a parachute shoulder harness and comprising two side walls, a bottom wall, an open end and a closed end wall and a hinged cover, and having a rotatable latch positioned therein, a tension spring between said latch and said closed end wall urging said latch to its unlocked position, and an adapter in engagement at one end with said latch and connected to the parachute suspension line at the other end, said latch comprising a first portion in contact with said cover when the latter is closed, a second portion in engagement with an opening in said bottom wall and a third hook portion for retaining said latch in the locked position, said adapter having a hook portion in engagement with the hook portion of said latch when said device is in its parachute retaining position.

2. A parachute detach device as in claim 1 further including at least one attachment web between said container and said shoulder harness, and a flange extending from the closed end of said container to which is connected the attachment web.

3. A parachute detach device as in claim 1 wherein said container is fixed to said shoulder harness by a flange comprising a plate having two parallel spaced apart arms with a hole in each arm, and a supporting bar extending between said arms in engagement with said holes to which bar a shoulder harness web is attached.

4. A parachute detach device as in claim 1 wherein said container is attached to the parachute shoulder harness, a flange extending from the bottom wall of said container and comprising two projecting portions, each being connected to an attachment web, the latter being attachable to said shoulder harness.

5. A parachute detach device comprising a container having a hingedly mounted cover, two side walls, an open end wall and a closed end wall, a bottom wall having a longitudinal slot having a second transverse slot in connection therewith, a rotatable latch mounted in said container, an adapter extending into the open end of said container and having a hook portion in engagement with said latch and connected to the parachute suspension lines, said latch having one portion engaged in said transverse slot, and a hole in said portion extending in a direction parallel to said longitudinal slot and in alignment therewith when said latch is engaged with said transverse slot, said container having a plurality of safety devices to prevent premature disengagement of said latch and said adapter, one of said safety devices including a safety wire rotatably mounted on the side walls of said container and having a flat spring extending across the end of said cover remote from its hinged mount, the second of said safety devices including a U-shaped spring attached to the underside of said cover and having a pair of projections in engagement with openings in said side walls and manually operable means in engagement with said projections to disengage the latter from said openings to release the cover, and the latch of said safety device including a safety pin frictionally held in the aligned longitudinal slot and transverse opening to retain said latch in its locked position and a pull cable and pull ring attached to said safety pin to remove the latter from its latch retaining position.

6. A parachute detach device as in claim 5 wherein said latch further includes a second cable attached thereto to provide a more positive rotation thereof during manual release of said adapter and said latch, said cable being connected at one end to said latch inside said latch inside said container and at the other end to said pull wire outside said container, said container further including a second slot in the closed end wall thereof through which said second cable extends between said latch and said pull cable, said slot being positioned relative to the ends of said second cable to provide a 2 inch slack therein.

7. A parachute detach device as in claim 5 wherein said adapter is movable relative to said latch to the disengaged position on impact of the descending parachutist with land or water, said latch being automatically rotatable in a counterclockwise direction by said tension spring on release of said safety device.

8. A quick release mechanism comprising a spring pressed rotatably positioned latch, a container housing said latch having a hingedly mounted cover normally in engagement with one portion of said latch when in the locked position to positively retain said latch in locked position and a longitudinal slot in the bottom wall thereof, said latch having a hole in a second portion thereof normally in alignment with said slot, a spring element rotatably mounted on said container to hold said cover in said locked position in one position of rotation, a U-shaped spring affixed in depending relation to the underside of said cover having a pair of spring pressed lugs engaged in openings in the side walls of said container when said cover is in said locked position, a safety pin frictionally engaged in said aligned hole and slot to hold said latch in its locking position, and a pull cable connected to said pin to remove said pin from its frictional engagement in said aligned hole and slot.

9. A quick release mechanism for the automatic release of the suspension lines of a parachute from a shoulder harness comprising an open end container attached to the shoulder harness and housing a rotatably mounted latch, a spring attached to said latch normally urging said latch to a disengaged position, and an adapter attached to the parachute suspension lines in normal taut relation thereto and slidably received within the open end of said container in normal engagement with said latch and automatically movable relative to said container and said latch to a latch-disengaged position on momentary release of the normal taut relation of the parachute suspension lines, said spring subsequently pivoting said latch to a latch-disengaged position after said automatic relative movement of said adapter.

References Cited in the file of this patent
UNITED STATES PATENTS
2,603,524     Amertung _____ July 15, 1952